United States Patent [19]

Shimp

[11] 4,388,374
[45] Jun. 14, 1983

[54] WATER REDUCIBLE COATING COMPOSIIONS

[75] Inventor: David A. Shimp, Prospect, Ky.

[73] Assignee: Celanese Corporation, New York, N.Y.

[21] Appl. No.: 412,731

[22] Filed: Aug. 30, 1982

Related U.S. Application Data

[62] Division of Ser. No. 264,780, May 18, 1981, Pat. No. 4,360,613.

[51] Int. Cl.$^3$ .............................................. B32B 27/38
[52] U.S. Cl. ..................................... 428/414; 428/335; 428/336; 428/413; 428/501; 428/503; 428/505; 428/514; 428/520; 428/522; 428/524; 428/530; 428/537
[58] Field of Search ............... 428/413, 336, 335, 414, 428/503, 501, 502, 504, 505, 514, 525, 520, 522, 524, 537, 530; 525/107; 528/108; 523/402; 427/386, 391, 411; 206/524.3; 215/DIG. 2

[56] References Cited

U.S. PATENT DOCUMENTS

| | | | |
|---|---|---|---|
| 2,541,027 | 2/1951 | Bradley | 148/6.15 |
| 2,709,690 | 5/1955 | Narracott | 260/18 |
| 2,732,367 | 1/1956 | Shokal | 260/47 |
| 2,990,396 | 6/1961 | Clark et al. | 260/47 |
| 3,055,876 | 9/1962 | Grotz | 260/87.1 |
| 3,245,940 | 4/1966 | Ronay et al. | 260/30.6 |
| 3,438,924 | 4/1969 | Chalmers et al. | 260/29.7 |
| 3,563,943 | 2/1971 | Davis et al. | 260/29.2 |
| 4,048,179 | 9/1977 | Shimp | 260/29.4 R |
| 4,164,487 | 8/1979 | Martin | 260/29.2 EP |
| 4,197,389 | 4/1980 | Becker et al. | 528/103 |

*Primary Examiner*—Thurman K. Page
*Attorney, Agent, or Firm*—Herbert P. Price

[57] ABSTRACT

Water reducible compositions useful as coating compositions for flexible substrates are prepard by reacting a glycidyl polyether of a dihydric phenol with a polyethylene glycol and ortho phosphoric acid.

2 Claims, No Drawings

WATER REDUCIBLE COATING COMPOSIIONS

This is a division of application Ser. No. 264,780, filed May 18, 1981, now U.S. Pat. No. 4,360,613.

BACKGROUND OF THE INVENTION

The field of art to which this invention pertains is water soluble resin compositions derived from epoxy resins and polyalkylene polyols terminated with phosphoric acid monoesters and to thermosetting coating compositions useful in the coating of flexible substrates.

In view of the air pollution caused by organic solvents and to the increasing scarcity and cost of hydrocarbon solvents, there is a continuing search for new and improved coating compositions which can be dissolved or dispersed in water.

Water-borne coatings are being investigated for use in coating flexible substrates, such as paperboard and metal foil used to package frozen foods. Coatings for such use must be flexible and adherent and must be capable of withstanding heating in both conventional and microwave ovens.

Water soluble coating compositions are disclosed in U.S. Pat. No. 4,048,179. Such coating compositions are made by reacting epoxy resins with polyethylene glycols with or without added dihydric phenol at high temperatures and long reaction times.

In U.S. Pat. No. 2,990,396, polyoxyalkylene polyols are reacted with polyepoxy compounds under Friedel-Crafts catalysis to form compositions which are useful as lubricants, dispersing agents, thickeners, suspending agents, coagulating agents, surface-active agents as well as coating, textile sizing, binding, laminating and casting compositions.

U.S. Pat. No. 3,055,876 discloses a process for suspension polymerization of vinyl monomers in the presence of a suspension agent which is the reaction product of a polyethylene glycol with the diglycidyl ether of Bisphenol A. The same sort of reaction product of a polyethylene glycol and a diglycidyl ether is used as an agglomerating agent for rubber latices as described in U.S. Pat. No. 3,438,924.

In U.S. Pat. No. 3,563,943, nonionic urethane latices are described wherein the emulsifying agent is the reaction product of aromatic diepoxides with polyethylene glycols.

U.S. Pat. No. 4,197,389 discloses hardening agents for aqueous epoxy resin compositions made by reacting a polyepoxide compound with a polyalkylene polyether polyol followed by reaction with a polyamine.

In commonly assigned pending U.S. application, Ser. No. 204,101 filed Nov. 5, 1980, water dispersible coating compositions are made by reacting a low molecular weight diglycidyl ether of a dihydric phenol, additional dihydric phenol and a diglycidyl ether of a polyoxyalkylene glycol.

Phosphoric acid terminated polyepoxide resins are described in U.S. Pat. No. 4,164,487. Such compositions can be dissolved in water and used as thermosetting coating compositions.

Adducts of epoxy resins and phosphoric or phosphonic acid are described in U.S. Pat. Nos. 3,245,940; 2,732,367 and 2,541,027. Such adducts are organic solvent soluble and are not shown to be water soluble.

Organic solvent soluble coating compositions made from epoxy resins esterified with drying oil fatty acids and phosphoric acid are described in U.S. Pat. No. 2,709,690.

In U.S. Pat. No. 4,059,550, coating compositions are disclosed which are made from aqueous dispersions of polyhydroxy polyether resins and aminoplast resins catalyzed with adducts of phosphoric acid and glycidyl polyethers of polyhydric phenols.

SUMMARY OF THE INVENTION

This invention relates to aqueous coating compositions made from the reaction product of an epoxy resin, a polyoxyalkylene glycol and phosphoric acid. In another aspect, the invention pertains to the process by which such products are made. In still another aspect, the invention relates to thermosetting coating compositions made from aqueous solutions or dispersions of the reaction products of epoxy resins, polyalkylene glycols and phosphoric acid in admixture with aminoplast resins. In yet another aspect, this invention pertains to ovenable paperboard and aluminum foil articles which are coated with the compositions of this invention.

By the process of this invention, a glycidyl polyether of a dihydric phenol is reacted with a polyethylene glycol and phosphoric acid in the presence of at least about 0.6 percent water based on total weight of the reactants at a temperature of about 100° to about 150° C. for a time sufficient for substantially all the epoxide groups to react with the glycol to form ether groups and with the phosphoric acid to form monoester groups. About 55 to about 90 weight percent of a glycidyl polyether of a dihydric phenol is reacted with about 8 to about 44.1 weight percent of a polyethylene glycol and about 0.9 to about 2 weight percent of ortho phosphoric acid, the weight percents being based on the total weight of the three reactants. The glycidyl polyether of the dihydric phenol has a molecular weight of about 800 to about 2500 and the polyethylene glycol has a molecular weight of about 300 to about 2000.

The compositions of this invention can be dissolved or dispersed in water with or without the use of a volatile amine or ammonia. The solutions or dispersions can be blended with aminoplast resins to form thermosetting coating compositions useful in coating a variety of substrates, particularly flexible substrates.

DESCRIPTION OF THE INVENTION

The glycidyl polyethers of dihydric phenols useful in this invention are derivatives of epihalohydrins and dihydric phenols which contain more than 1 to about 2 epoxide equivalents per molecule. The glycidyl polyethers can be made by reacting a molar excess of epihalohydrin with a dihydric phenol as described in U.S. Pat. No. 2,615,007, or a molar excess of a lower molecular weight glycidyl polyether of a dihydric phenol with additional dihydric phenol as described in U.S. Pat. No. 2,615,008. The molecular weight, melting point and epoxide equivalent weight of such glycidyl polyethers can be varied over a wide range by varying the ratio of epihalohydrin or glycidyl polyether to dihydric phenol. The molecular weights useful in this invention are about 800 to about 2500. Expressed as epoxide equivalents, the values are about 400 to about 1250. Preferably, the molecular weights are about 1000 to about 1500 and the epoxide equivalent weights are about 500 to about 750.

The epihalohydrins useful in making the glycidyl polyethers are epichlorohydrin, epibromohydrin and epiiodohydrin with epichlorohydrin being preferred. The dihydric phenols from which the glycidyl polyethers can be made include resorcinol, hydroquinone, p,p'-dihydroxydiphenyl propane or Bisphenol A as it is commonly called, 4,4'-dihydroxydiphenyl sulfone, 4,4'-dihydroxybenzophenone, 4,4'-dihydroxy biphenyl and the like. The most preferred dihydric phenol is p,p'-dihydroxydiphenyl propane.

The polyethylene glycols useful in this invention are polyoxyethylene glycols having terminal primary hydroxyl groups. Such glycols are derived from ethylene oxide and are well known in the art. Polyethylene glycols useful in this invention have molecular weights within the range of about 300 to about 2000, and, preferably, about 500 to about 1200.

The phosphoric acid used in this invention is ortho phosphoric acid and can be utilized in its pure crystalline form or as its hydrate. However, it is preferably used in its usual commercial form which is referred to as concentrated phosphoric acid and is about 80–90 weight percent in water.

The glycidyl polyether of the dihydric phenol, the polyethylene glycol and the phosphoric acid are reacted in the amounts of about 55 to about 90 weight percent glycidyl polyether, about 8 to about 44.1 weight percent glycol and about 0.9 to about 2 weight percent ortho phosphoric acid, the weight percents being based on the total weight of the three reactants. The preferred amounts are about 60 to about 75 weight percent glycidyl polyether, about 24 to about 38.5 weight percent glycol and about 1 to about 1.5 weight percent ortho phosphoric acid. These weight ratios are so adjusted that there is a molar excess of the sum of polyethylene glycol and phosphoric acid over the glycidyl polyether, i.e., sufficient amounts of glycol and acid are reacted with the glycidyl polyether so that the resulting resin is terminated with reacted glycol and acid groups. The amount of acid used is such that the resulting resinous composition has a minimum of 25 mole percent acid monoester termination, i.e., there is an average of at least one phosphoric acid monoester termination for every two resin molecules formed.

In carrying out the process of this invention, the glycidyl polyether of the dihydric phenol, the polyethylene glycol and the phosphoric acid are heated together at a temperature of about 100° to about 150° C. for a time sufficient to complete the reaction. In order to prevent premature gelation of the glycidyl polyether by contact with concentrated phosphoric acid, it is preferred to melt the glycidyl polyether with a portion of the polyethylene glycol while using the remaining glycol to dilute the phosphoric acid. Alternatively, the phosphoric acid can be added to all of the polyethylene glycol and this solution can be mixed and reacted with the glycidyl polyether. In the preferred process of this invention, the glycidyl polyether of the dihydric phenol is blended and heated with 10 to 50 weight percent of the polyethylene glycol. The remaining glycol and the phosphoric acid are then slowly added at a temperature of about 70° to about 100° C. After all the glycol and acid are added, the temperature of the reactants is held at about 100° to about 150° C., preferably about 105° to about 130° C., until the epoxide equivalent weight of the reaction mixture is above about 4000, i.e., substantially infinity. The time for the reaction to be completed will depend upon the particular reactants and reactant ratios as well as the temperature. Generally the time required to complete the reaction will be about 2 to about 10 hours.

In carrying out the process of this invention, there must be present in the reactor at least 0.6 weight percent water based on total weight of the reactants. This amount of water includes any water present in the glycidyl polyether, the glycol and the acid. If less than 0.6 weight percent water is present, the reaction will not go to completion due to insufficient hydrolysis of di and triphosphoric esters to monophosphoric acid esters. When di and tri esters are present rather than the monoester, there is insufficient acidity to catalyze the epoxide-hydroxyl reaction. At least 0.6 weight percent water is sufficient to hydrolyze any phosphoric acid polyesters to the stable monoester. No more than about 2 weight percent water should be present since the water competes with the glycol for reaction with the epoxide groups of the glycidyl polyether of the dihydric phenol.

The reaction of the glycol, the glycidyl polyether and the phosphoric acid is conducted in the absence of solvents. When the reaction is completed, the warm, fluid reaction product can be dissolved in water with or without ammonia or volatile amine salting. However, in order to facilitate handling and pigmentation of the reaction product, it can be reduced to a pourable or pumpable liquid solution with selected organic solvents. Generally, up to about 50 weight percent solvent, based on total solution weight, can be used. Useful solvents are water soluble or water dispersible ones, e.g., alcohols and glycol ethers. Examples of such solvents include isopropanol, n-propanol, n-butanol, 2-ethoxyethanol, 2-propoxyethanol, diacetone alcohol and diethylene glycol monobutyl ether.

The terms "dissolved" and "solution" as used herein are intended to describe not only true solutions but colloidal solutions, microemulsions, or other dispersed aggregates of resin in water characterized by aggregate diameters of less than 0.1 micron, spontaneous formation and non-sedimenting at high dilution.

The resinous compositions of this invention are water reducible with or without the addition of a base to salt the residual acidity of the resin-bound phosphoric acid esters. Translucent (nearly transparent to hazy) microemulsions are formed by blending the resin, preferably dissolved in an alcoholic solvent, with sufficient water to lower the resin solids to about 20–50 percent N.V. The components can be blended together in any sequence at room temperature or at elevated temperatures using low or high shear mixing. The preferred procedure is to add a volatile amine or ammonia to the resinous product and then add water with stirring to the desired nonvolatile range. The following differences are found between the solutions formed with added base (anionic solutions) and those where no base is added (nonionic solutions):

1. The rheology of the anionic solutions is initially Newtonian whereas the nonionic solutions exhibit pseudoplasticity.
2. Application solids for the anionic solutions is 5 to 10% higher than that of the nonionic systems.
3. The cloud point (temperature at which the microemulsion clouds and increases markedly in viscosity) of the anionic systems is elevated by about 40° C. over that of the nonionic systems.
4. Dilution of the anionic systems with water into the intermediate viscoelastic (liquid crystal) phase region is not accompanied by as much viscosity increase as when the nonionic systems are diluted.

Volatile bases used to salt the phosphoric acid ester terminated compositions of this invention are ammonia and amines. Useful amines include N-methylmorpholine, diethanolamine, N-ethylmorpholine, N-methylethanolamine, N-methyldiethanolamine, triethylamine, dimethylaminoethanol and the like. The amount of volatile base that can be used will vary from 0 up to about 3 moles per each mole of reacted phosphoric acid in the resinous composition. Preferably about 1 to about 2 moles of base are used per mole of reacted acid.

The compositions of this invention are useful in preparing thermosetting coating compositions when mixed with aminoplast resins. Aminoplast resins are the reaction products of ureas and melamines with aldehydes further etherified in some cases with an alcohol. Examples of aminoplast resin components are urea, ethylene urea, thiourea, melamine, benzoguanamine and acetoguanamine. Aldehydes include formaldehyde, acetaldehyde and propionaldehyde. The aminoplast resins can be used in the alkylol form, but, preferably, are utilized in the ether form wherein the etherifying agent is a monohydric alcohol containing from 1 to about 8 carbon atoms. Examples of aminoplast resins are dimethylol urea, dimethoxymethyl urea, butylated polymeric urea-formaldehyde resins, trimethoxymethyl melamine, hexamethoxymethyl melamine, methylated polymeric melamine-formaldehyde resins and butylated polymeric melamine-formaldehyde resins. The preferred aminoplast resins are trimethoxymethyl melamine and hexamethoxymethyl melamine.

The amount of aminoplast resin used in combination with the polyglycidyl ether, glycol, phosphoric acid reaction product will vary from about 5 to about 40 weight percent based on total resin solids weight, and, preferably, about 15 to about 25 weight percent.

Temperatures used to cure the compositions of this invention are well known in the art and vary widely depending upon the type heating used, the substrate which is coated, the particular aminoplast resin used and the ratios used. Generally the web temperatures will vary from about 230° F. up to about 450° F. with oven air being about 300° to about 600° F. Times for cures will vary from 3 seconds up to 30 minutes.

The thermosetting compositions of this invention are particularly useful as coatings for ovenable paperboard which is subsequently formed into trays and cartons for packaging "heat and serve" convenience foods, as coatings for aluminum foil used in packaging, aluminum foil used to face insulation board and formable aluminum sheets used in the manufacture of bottle closures.

Coated paperboard stock used in preparing ovenable trays and cartons is made using successive coatings on the paperboard. A useful paperboard is sulfite bleached paperboard having a weight of about 50 to 100 pounds per 1000 square feet and a thickness of about 15 to 25 mils. The paperboard is first coated with a sealer coat which is made from a thermoplastic latex, preferably a vinyl acetate homopolymer or copolymer latex. Examples of useful copolymers are vinyl acetate-dibutyl maleate, vinyl acetate-dibutyl fumarate, vinyl acetate-ethylene, vinyl acetate-ethyl acrylate, vinyl acetate-butyl acrylate, vinyl acetate-butyl acrylate-maleic acid and the like, i.e., copolymers well-known in the art. Preferably the sealer coat is not pigmented. The sealer coated paperboard is then coated with 2 coats of the thermosetting coating composition described hereinbefore, i.e., the aqueous microemulsion made from the polyglycidyl ether, glycol, phosphoric acid reaction product and an aminoplast resin. Each coating may be pigmented with a pigment, e.g., titanium dioxide, but, preferably, the coating next to the sealer coat is pigmented and the top coat is unpigmented. The amount of pigment used will vary from about 40 to about 60 weight percent of the total weight of pigment and binder in the specific coating. The total dry coating thickness will vary from about 0.5 to about 1.5 mils with each coating being applied in approximately equal thicknesses. The coatings, after each application step, can be heated at a temperature and time sufficient to cure the coating. However, it is preferred to heat the coating just to dry it and then to cure the coatings after all have been applied. As an example, coatings can be applied to the paperboard at line speeds up to and above 600 ft./min. with residence times in a 600° F. heated oven after each coating is applied of 1, 5 and 6 seconds.

The invention can be more thoroughly understood by referring to the following examples. Parts and percentages where used in the examples, unless otherwise specified, are parts by weight.

EXAMPLE 1

To a suitable reactor were added 46.05 parts of a glycidyl polyether of Bisphenol A having an epoxide equivalent weight of 701, 2.82 parts of polyethylene glycol having an average molecular weight of 1000 and 12.40 parts of polyethylene glycol having an average molecular weight of 600. Heating and agitation were begun and at 195° F., a solution of 7.89 parts of polyethylene glycol having an average molecular weight of 600 and 0.88 part of 85% orthophosphoric acid was added over a three minute period. The temperature of the reactants was raised to 200° F. and at this temperature, heating was discontinued. The temperature, due to the exothermic reaction, rose to 219° F. in 28 minutes. Heating was then resumed and the temperature was held at 225°–235° F. for 5 hours and 15 minutes. At the end of this heating period, 28.96 parts of propoxyethanol were added over 10 minutes with stirring. The temperature of the resulting solution was dropped to 110° F. and 0.85 part of ammonium hydroxide (28%) was added followed by 0.15 part of a fluorocarbon surfactant (Zonyl FSP, 35% in water, E. I. duPont de Nemours & Co., Inc.). The resulting product had an epoxide equivalent weight of 4704 on solids basis, a Gardner-Holdt viscosity at 25° C. of $Z_6$–$Z_7$ and a % solids of 70.6.

To 50 parts of the above solution were added 50.5 parts of deionized water (Microemulsion A). After standing overnight, the resulting microemulsion was transparent and opalescent, had a pH of 9.35 and a Gardner-Holdt viscosity at 25° C. of F. Thirty parts of Microemulsion A were blended with 3.49 parts of an 80% solution of trimethoxymethylmelamine in isobutanol, and 5 parts of deionized water forming Microemulsion B.

To 88.4 parts of Microemulsion A were added 72.63 parts of titanium dioxide pigment. The mixture was stirred using a high speed Dispersator until smooth. The resulting paste was diluted with 90 parts of deionized water forming Pigment Dispersion A. Sixty parts of Pigment Dispersion A were mixed with 7 parts of deionized water and 3.12 parts of trimethoxymethyl melamine (80% solids in isobutanol) forming Pigment Dispersion B.

Paperboard was given three coats of Microemulsion B applied with a No. 12 Meyer rod. Each coat was baked 35 seconds at 325° F. The resulting coatings on the paper were tack free, glossy and passed a heat blocking test—3 seconds at 400° F. under 40 psi pressure. The heat blocking test is conducted on a strip of coated paper folded so that the coated surfaces are on the inside and against each other. The folded strip is inserted between 2 heated steel surfaces and pressure is applied for the designated time. The folded strip is then removed, cooled, and the surfaces are pulled apart. If any part of the surfaces stick together, the coating fails the test.

Paperboard was given one coat of Microemulsion B, using a No. 12 Meyer rod, was baked 35 seconds at 325° F., was then given 2 coats of Pigment Dispersion B, also with a No. 12 Meyer rod, each coat being baked 35 seconds at 325° F. The resulting coatings were tack free, glossy and passed a heat blocking test—3 seconds at 400° F. under 40 psi pressure.

EXAMPLE 2

Paperboard was given one coat of a latex of a copolymer of vinyl acetate (89%), butyl acrylate (10%) and maleic acid (1%), at 50% solids in water, using a #12 Meyer rod. After heating for 60 seconds at 300° F., the sealed paperboard was given two coats of Pigment Dispersion B from Example 1 using a #12 Meyer rod, the coated paperboard being heated for 40 seconds at 325° F. after each coat had been applied.

Paperboard was coated and baked using the same procedure as described above except the coatings were applied with a #14 Meyer rod.

Paperboard was coated and baked using the same procedure as described above except the sealer coat was applied with a #16 Meyer rod and the other coats were applied with a #12 Meyer rod.

The coated paperboard was tested for odor as follows: the paperboard was cut into squares and 60–80 square inches of the coated papers were placed in 2 liter resin pots along with 10 ml. of water. The ground glass tops of the resin pots were covered with a sheet of glass which was secured with tape. The pots were then heated for 4 hours at 120° F. After cooling, each pot was tested for odor by personnel trained for odor test panels. No odors were detected other than those characteristic of uncoated paperboard.

EXAMPLE 3

To 30 parts of Microemulsion A from Example 1 were added 3.49 parts of an 80% solution of trimethoxymethyl melamine in isobutanol and 3.2 parts of deionized water forming Microemulsion 3B.

To 30 parts of Pigment Dispersion A from Example 1 were added 3.12 parts of an 80% solution of trimethoxymethyl melamine in isobutanol and 6 parts of deionized water forming Pigment Dispersion 3A.

Paperboard stock (sulfite bleached having a weight of 50 lbs./1000 sq.ft.) was coated with a latex of ethylene-vinyl acetate copolymer (Elvace 1873—E. I. duPont de Nemours Co., Inc.) using a #12 Meyer rod. The coated paper was heated at 300° F. for 60 seconds. A second coating was applied using Pigment Dispersion 3A applied with a #14 Meyer rod. The coated paper was heated at 325° F. for 35 seconds. A third coating was then applied using Microemulsion 3B and a #14 Meyer rod. The coated paper was heated at 325° F. for 35 seconds. The weight of the coating applied to the paperboard was 19.5 lbs. per 3000 sq.ft. and the thickness of the coating was 0.9 mil. The coating had a gloss rating of 70 at 60° and a water vapor transmission rate of 48.8 gms/meter$^2$/24 hours (Mocon tester, 37.8° C. at 90% relative humidity). The coating passed a 6 second heat block test (40 psi at 400° F.) and when folded and creased passed a 4.5 L hour grease resistance test (TAPPI T-454). The coated paper was folded into a convex and a concave bend and was heated for 30 minutes at 450° F. The coating turned tan in color and exhibited no cracks at the bends. The coated paper was then folded into a tray, the tray was filled with water and was left at room temperature for 24 hours. The water was then poured off and the tray was blotted dry. The tray was then weighed and showed a weight gain of 4.9%.

Paperboard stock (sulfite bleached—50 lbs./1000 sq.ft.) was coated with the vinyl acetate copolymer latex described in Example 2 using a #12 Meyer rod. After heating for 1 minute at 300° F., the paper was coated with Pigment Dispersion 3A and Microemulsion 3B using the same procedure described in the preceding paragraph. The coating weight was 19.5 lbs./3000 sq.ft. with a thickness of 0.9 mil. The coating had a gloss reading of 68, a water vapor transmission rate of 49.1, passed a 6 second heat block test and 4.5 hours grease resistance test. After 30 minutes heating at 450° F., the coating on a folded paper strip was tan in color and exhibited a few cracks on the convex fold. The coated paperboard exhibited a weight gain of 4.7% after the 24 hour water tray test and exhibited no odor different from that of uncoated paperboard when tested by the procedure described in Example 2.

EXAMPLE 4

To a suitable reactor were added 381 parts of a glycidyl polyether of Bisphenol A, having an epoxide equivalent weight of 669, 100 parts of polyethylene glycol having an average molecular weight of 1000 and 35 parts of polyethylene glycol having an average molecular weight of 600. Heat was applied raising the temperature to 90° C. A solution of 7 parts of orthophosphoric acid (85% in water) and 70 parts of polyethylene glycol (average molecular weight—600) was slowly added to the reactor. The temperature was then raised to 110° C. and was held at this temperature for 6 hours. Propoxyethanol, 176.8 parts, was then added and heating was continued for 2 hours at 110° C. The resulting product had a solids content of 77%, a Gardner-Holdt viscosity at 25° C. of greater than $Z_7$ and an epoxide equivalent weight, on solids basis, of 4812.

To 500 parts of the above solution were added 50 parts of hexoxyethanol, 5.6 parts of 28% aqueous ammonia and 0.68 part of a fluorocarbon surfactant at 35% in water (Zonyl FSP—E. I. duPont de Nemours & Co., Inc.). After standing overnight, the solution was diluted with 623.5 parts of deionized water. The resulting microemulsion (Microemulsion 2A) had a solids content of 33%. To 58 parts of Microemulsion 2A were added 6.1 parts of trimethoxymethyl melamine at 85% solids in isobutanol. After standing overnight, 7.6 parts of deionized water were added. The resulting microemulsion had a solids content of 33.5% and a Gardner-Holdt viscosity at 25° C. of F-G. Aluminum panels were coated with the microemulsion with a soft rubber roller. The panels were baked at 370° F. for 2 minutes. The coatings passed 5 methylethyl ketone double rubs and showed no effect after immersion in 180° F. water for 10 minutes. They passed the wet adhesion test 100%.

To 58 parts of Microemulsion 2A were added 4.8 parts of hexamethoxymethyl melamine (Cymel 350—American Cyanamid Co.). After standing overnight, 13 parts of deionized water were added. The resulting microemulsion had a solids content of 31.5% and a Gardner-Holdt viscosity at 25° C. of F-G. Aluminum panels were roller coated with the microemulsion and were baked at 370° F. for 2 minutes. The coatings passed 5 methylethyl ketone double rubs. They showed no effect after 10 minutes immersion in 180° F. water and passed the wet adhesion test 100%.

To 58 parts of Microemulsion 2A were added 4.8 parts of hexamethoxymethyl melamine (Cymel 303—American Cyanamid Co.). After standing overnight, 16 parts of deionized water were added. The resulting microemulsion had a solids content of 30.3% and a Gardner-Holdt viscosity of F-G at 25° C. Aluminum panels were roller coated with the microemulsion and were baked at 370° F. for 2 minutes. The coatings passed 8 methylethyl ketone double rubs. They showed no effect after 10 minutes immersion in 180° F. water and passed the wet adhesion test 100%.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:
1. Ovenable coated paperboard comprising paperboard stock first coated with a sealer coating of a vinyl acetate homopolymer or copolymer, followed by two coats of a cured composition comprising
    (A) the reaction product of
        (a) about 55 to 90 weight percent of a glycidyl polyether of a dihydric phenol having a molecular weight of about 800 to about 2500;
        (b) about 8 to about 44.1 weight percent of a polyethylene glycol having a molecular weight of about 300 to about 2000; and
        (c) about 0.9 to about 2 weight percent of ortho phosphoric acid; and
    (B) aminoplast resin wherein the total coating has a thickness of about 0.5 to about 1.5 mils.
2. The coated paperboard of claim 1 wherein the second coating is pigmented.

* * * * *